United States Patent
Furukawa et al.

(10) Patent No.: US 8,520,142 B2
(45) Date of Patent: Aug. 27, 2013

(54) FRAME INTERPOLATION APPARATUS

(75) Inventors: Riichi Furukawa, Gifu-ken (JP); Satoshi Otowa, Gifu-ken (JP)

(73) Assignee: On Semiconductor Trading, Ltd., Hamilton (BM)

( * ) Notice: Subject to any disclaimer, the term of this patent is extended or adjusted under 35 U.S.C. 154(b) by 83 days.

(21) Appl. No.: 13/194,395

(22) Filed: Jul. 29, 2011

(65) Prior Publication Data

US 2012/0026391 A1    Feb. 2, 2012

(30) Foreign Application Priority Data

Jul. 30, 2010  (JP) ................. 2010-172191

(51) Int. Cl.
*H04N 7/01*    (2006.01)
*H04N 11/20*   (2006.01)

(52) U.S. Cl.
USPC ..................................... 348/459; 348/448

(58) Field of Classification Search
USPC .................................. 348/441–459
See application file for complete search history.

(56) References Cited

U.S. PATENT DOCUMENTS

2004/0165662 A1 *  8/2004  Battistella ............. 375/240.01
2007/0268965 A1 * 11/2007  Alfonso et al. ........ 375/240.01

FOREIGN PATENT DOCUMENTS

JP    2009-239335    10/2009

* cited by examiner

*Primary Examiner* — Michael Lee
(74) *Attorney, Agent, or Firm* — McDermott Will & Emery LLP

(57) ABSTRACT

A frame interpolation apparatus receives moving images from an image generating apparatus that outputs moving images by increasing the number of frames by adding n units (n being a natural number) of copy frame following each frame of the moving images. A frame acquisition unit samples a frame from the moving images in cycles of (n+1) frames. An interpolated frame generation unit generates an interpolated frame to be inserted between the frames sampled by the frame acquisition unit. An identity determining unit determines the identity of successive frames of the moving images. A sampling point changing unit shifts a sampling point while keeping fixed cycles when there is a succession of less than or more than (n+1) frames determined to be identical by the identity determining unit and besides a certain condition is met.

10 Claims, 13 Drawing Sheets

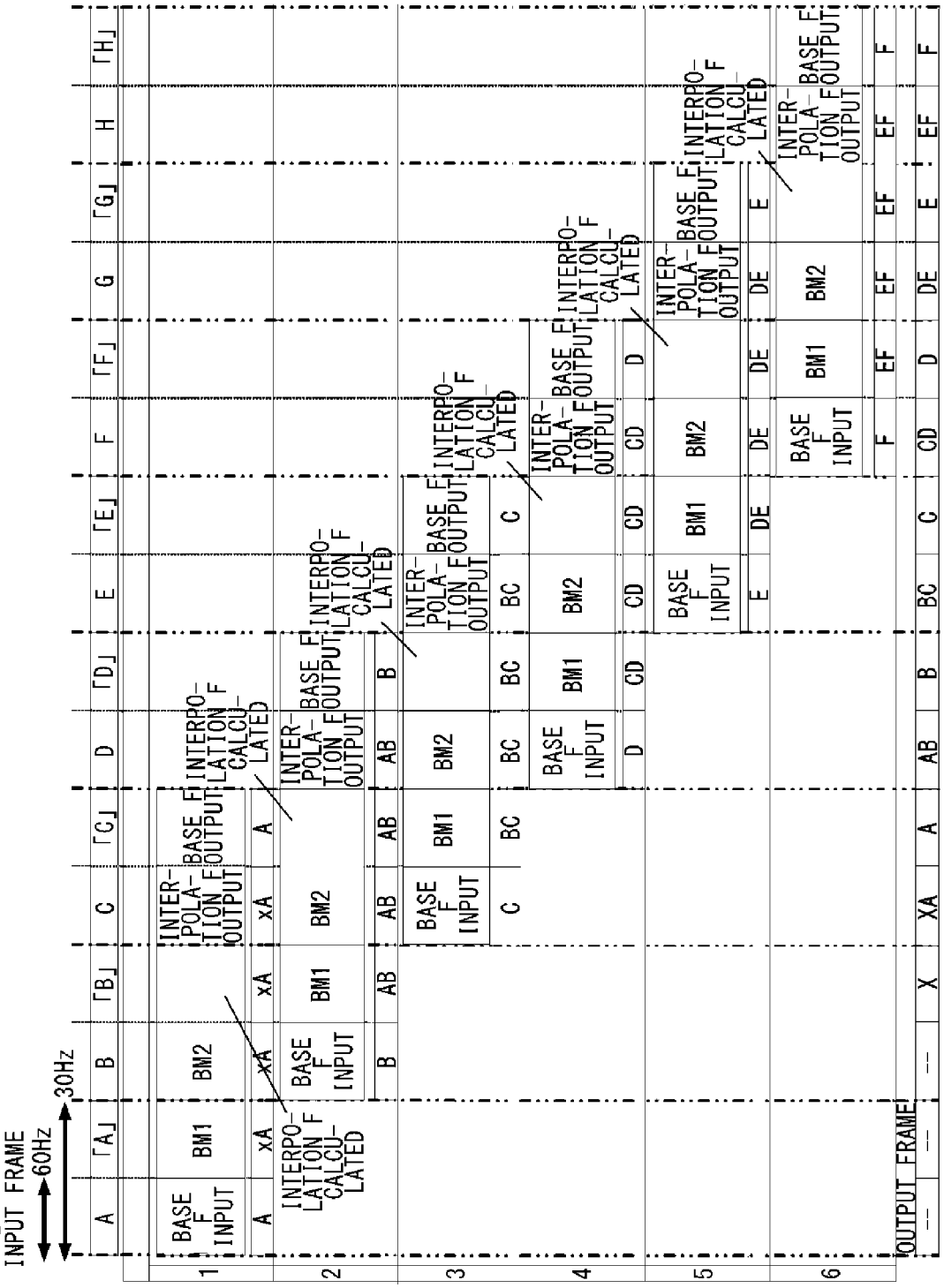

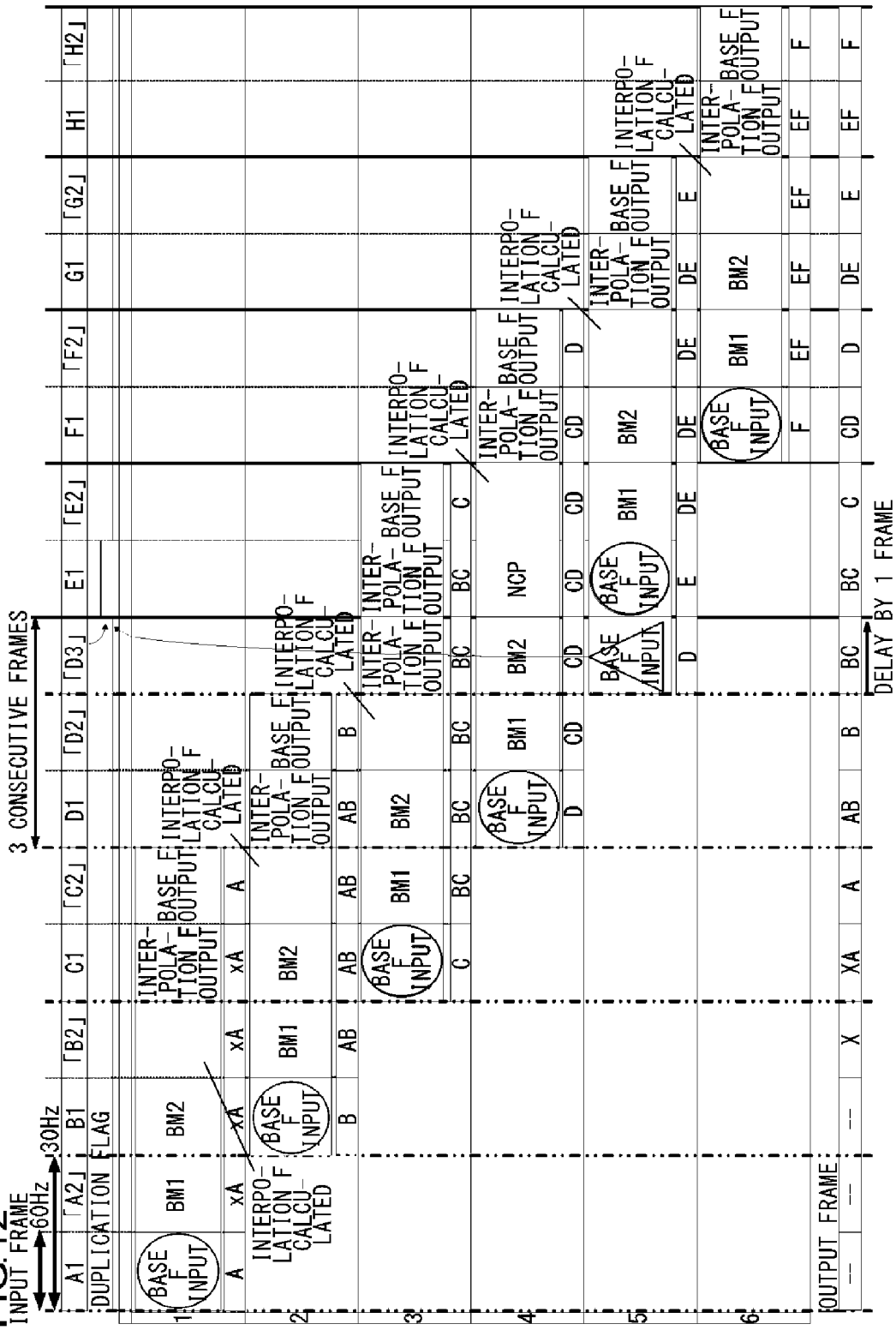

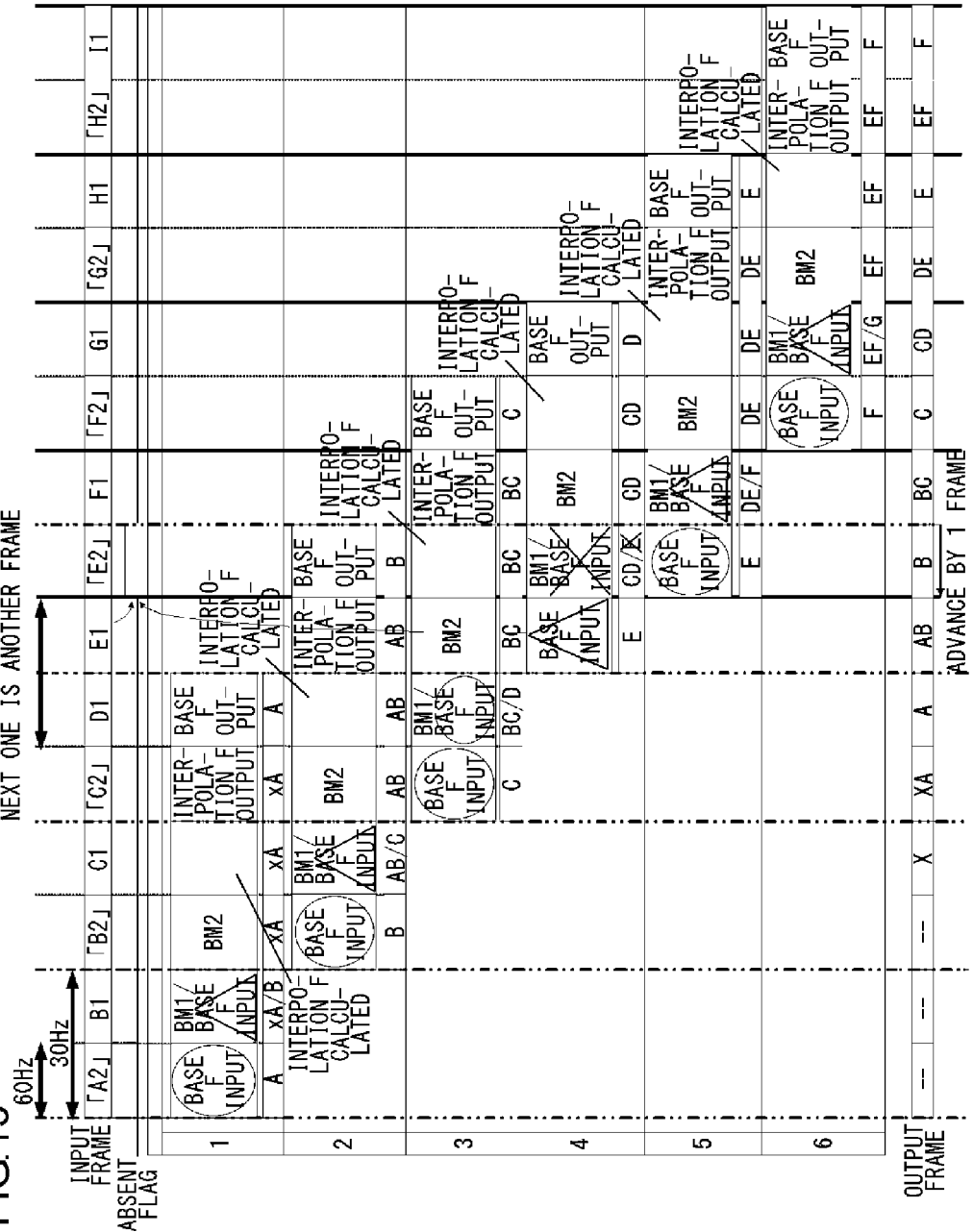

FRAME INTERPOLATION APPARATUS

This application is based upon and claims the benefit of priority from the prior Japanese Patent Application No. 2010-172191, filed on Jul. 30, 2010, the entire content of which is incorporated herein by reference.

BACKGROUND OF THE INVENTION

1. Field of the Invention

The present invention relates to a frame interpolation apparatus for generating interpolated frames between base frames and inserting them between the base frames.

2. Description of the Related Art

Recent years have seen the practical application of techniques to generate smoother moving images free of much image lag by increasing the number of image frames using frame interpolation technology. For example, a technology in practical use is such that moving images of 60 frames per second (60 Hz) are converted into moving images of 120 Hz for display at a doubled speed.

In Japan, the one-segment broadcasting started in April 2006. The so-called "One Seg" (one-segment) broadcasting is a broadcasting using narrow bands intended mainly for the receiving by mobile devices such as mobile phones. In One Seg broadcasting, the images are normally transmitted at 15 frames per second (15 Hz), so that there is greater necessity for increase in the number of frames. With a general One Seg decoder, video image output is made at a frame frequency of 60 Hz, so that basically four frames of the same video image are outputted. In this case, a frame interpolation apparatus for increasing the number of frames of moving images using the aforementioned frame interpolation technology is connected in a position subsequent to the One Seg decoder.

There is a technology proposed for such a frame interpolation apparatus, in which the number of frame repetitions is continuously counted to detect any change in the succession, and when the result of detection is not a four-frame succession, the interpolation processing is halted or the sampling frame is shifted.

In the above-mentioned technology, the sampling frame is changed whenever a change in the number of input frame repetitions occurs, and as a result the sampling rate becomes variable. If there is an error in detecting the number of frame repetitions due to low detection accuracy of frame repetitions (for example, the detection determines the absence of a change point despite its actual presence in the input video image), there will be a failure to sample the video image. Under such circumstances, cases may arise where the input images are not reflected in the output images.

Also, the images to be inputted to the frame interpolation apparatus may not only be ones for One Seg broadcasting, but may sometimes be ones with clock OSD (On-Screen Display) or touch panel OSD superposed thereon. Then, as a result of counting frame repetitions, there may be cases where the number of repetitions is judged to be 1, 2, or 3, for instance, depending on the effect of OSD. In this case, a problem arises where the actual number of repetitions of one-segment video image cannot be detected correctly. In such a case, if the sampling point is shifted at variable sampling rate, processings of large bandwidths may sometimes overlap with each other in the computation of frame interpolation in a pipeline process. And this may present possibilities of a rising peak of bandwidth of SDRAM (Synchronous Dynamic Random Access Memory). Further, the then video images at the frame interpolation output may lose the smoothness which is otherwise preset.

Even though the number of repetitions of one-segment video image except for OSD is detected, another problem arises where the clock in OSD remains stopped or unchanged while the actual time elapses, when the sampling frame is variable. This is because when the sampling frame is variable and, for instance, the clock OSD is superposed on a stopped one-segment video image, no sampling is effected unless any change occurs in the one-segment video image.

SUMMARY OF THE INVENTION

A frame interpolation apparatus according to one embodiment of the present invention receives moving images from an image generating apparatus that outputs moving images by increasing the number of frames by adding n units (n being a natural number) of copy frame following each frame of the moving images, and the frame interpolation apparatus includes: a frame acquisition unit configured to sample a frame from the moving images in cycles of (n+1) frames; an interpolated frame generating unit configured to generate an interpolated frame to be inserted between the frames sampled by the frame acquisition unit; an identity determining unit configured to determine the identity of successive frames of the moving images; and a sampling point changing unit configured to shift a sampling point while keeping fixed cycles when there is a succession of less than or more than (n+1) frames determined to be identical by the identity determining unit and besides a certain condition is met.

Another embodiment of the present invention relates to a display apparatus. The display apparatus includes the above-described frame interpolation apparatus and a display unit configured to display moving images which have been subjected to a double speed conversion executed by the frame interpolation apparatus.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 11 is a timing chart showing a basic operation of a frame interpolation apparatus according to a modification;

FIG. 12 is a timing chart showing an operation example where a frame interpolation apparatus according to a modification handles a 3-frame repetition input; and FIG. 13 is a timing chart showing an operation example where a frame interpolation apparatus according to a modification handles a case when there is no successive frame input.

DETAILED DESCRIPTION OF THE INVENTION

The invention will now be described by reference to the preferred embodiments. This does not intend to limit the scope of the present invention, but to exemplify the invention.

Figure 1:
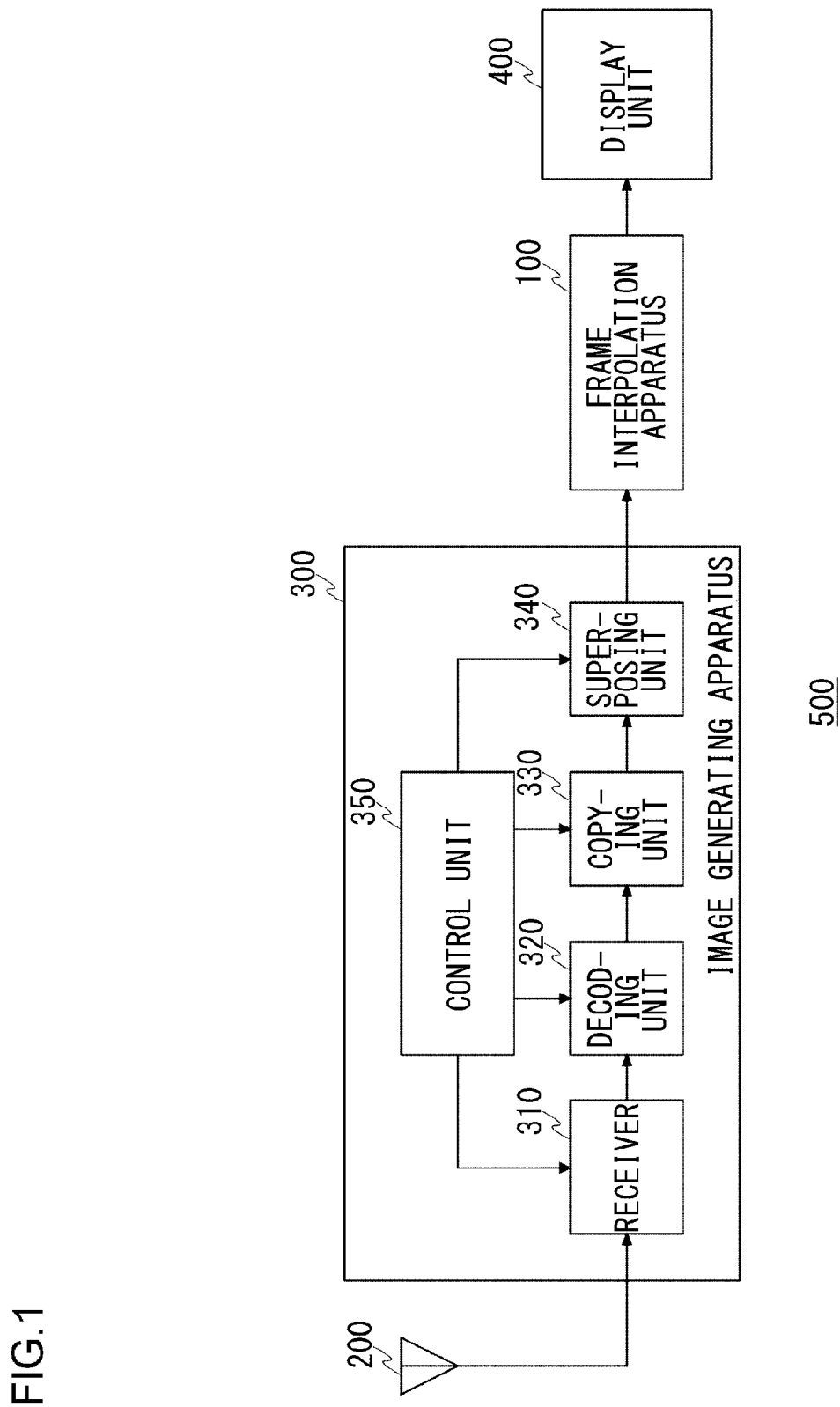
FIG. 1 shows a functional structure of a display apparatus according to an embodiment of the present invention.

FIG. 1 shows a functional structure of a display apparatus 500 according to an embodiment of the present invention. The display apparatus 500, which receives television broadcasting such as one-segment (One Seg) broadcasting, is an equipment provided with a function of reproducing and displaying video signals. For example, the display apparatus 500 may be a device exclusively used to receive and reproduce One Seg broadcasting. Or, the display apparatus 500 may be a mobile phone, a smart phone, a mobile-type music player, an electronic dictionary, a car navigation device or the like provided with such a function of reproducing and displaying video signals. The display apparatus 500 may be not only an apparatus that receives the television broadcasting but also one that may display moving images.

The display apparatus 500 includes an antenna 200, an image generating apparatus 300, a frame interpolation apparatus 100, and a display unit 400. The image generating apparatus 300 decodes the received signals and outputs the moving images. At this time, the image generating apparatus 300 outputs the moving images obtained by decoding the received signals, by increasing the number of frames in such a manner that n units (n being a natural number) of copy frame are added following each frame of the moving images. In the example where One Seg broadcasting is received, three units of copy frame are added following each frame, so that the number of frames is increased four times.

The image generating apparatus 300 includes a receiver 310, a decoding unit 320, a copying unit 330, a superposing unit 340, and a control unit 350. The receiver 310 receives the One Seg broadcasting via the antenna 200, demodulates the signals of a selected channel, and outputs the demodulated signals to the decoding unit 320. The decoding unit 320 decodes the coded data inputted from the receiver 310. Here, One Seg broadcasting images are coded by complying with the AVC/H.264 standard. The decoding unit 320 outputs the decoded frames to the copying unit 330.

The copying unit 330 simply duplicates the frame inputted from the decoding unit 320 and outputs the thus duplicated frames to the superposing unit 340. As described above, the images are transmitted at 15 Hz in One Seg broadcasting. The copying unit 330 converts the images of 15 frames per second into those of 60 frames per second. Thereby, the images can be displayed by the display unit (display panel) 400 driven at 60 Hz. Before the decoded frames are inputted to the superposing unit 340, they are actually subjected to a resolution conversion by a not-shown scaler, which is omitted in FIG. 1.

The superposing unit 340 superposes an on-screen display (OSD) on an image plane of the moving images received from the copying unit 330. OSD, which is expressed by characters (including numerals), symbols and the like, corresponds to channel information, sound volume information, date information, time information, information on radio wave conditions, information on the remaining amount of battery, and the like. Also, OSD corresponds to an operation screen which is a touch panel input means. Note that the superposing unit 340 may set a plurality of OSD regions within the image plane. OSD is information later appended to each frame not by a transmitter station but by a receiver side. The display position of OSD superposed on the image plane is predetermined, and the image generating apparatus 300 stores the positional information on the OSD region according to the type of OSD.

The control unit 350 sets OSD in the superposing unit 40 to superpose OSD on the image plane. The control unit 350 controls the operations of the receiver 310, the decoding unit 320, and the copying unit 330, too.

The frame interpolation apparatus 100 receives the supply of moving images from the image generating apparatus 300. The frame interpolation apparatus 100 performs N-times (N×) speed conversion (N being a natural number) on the received moving images so as to improve the quality of video images. Hereinbelow in this patent specification, a description is given of an example where a double speed conversion (N being 2 in this case) is carried out. The display unit 400 displays moving images which have been subjected to the double speed conversion.

Figure 2:
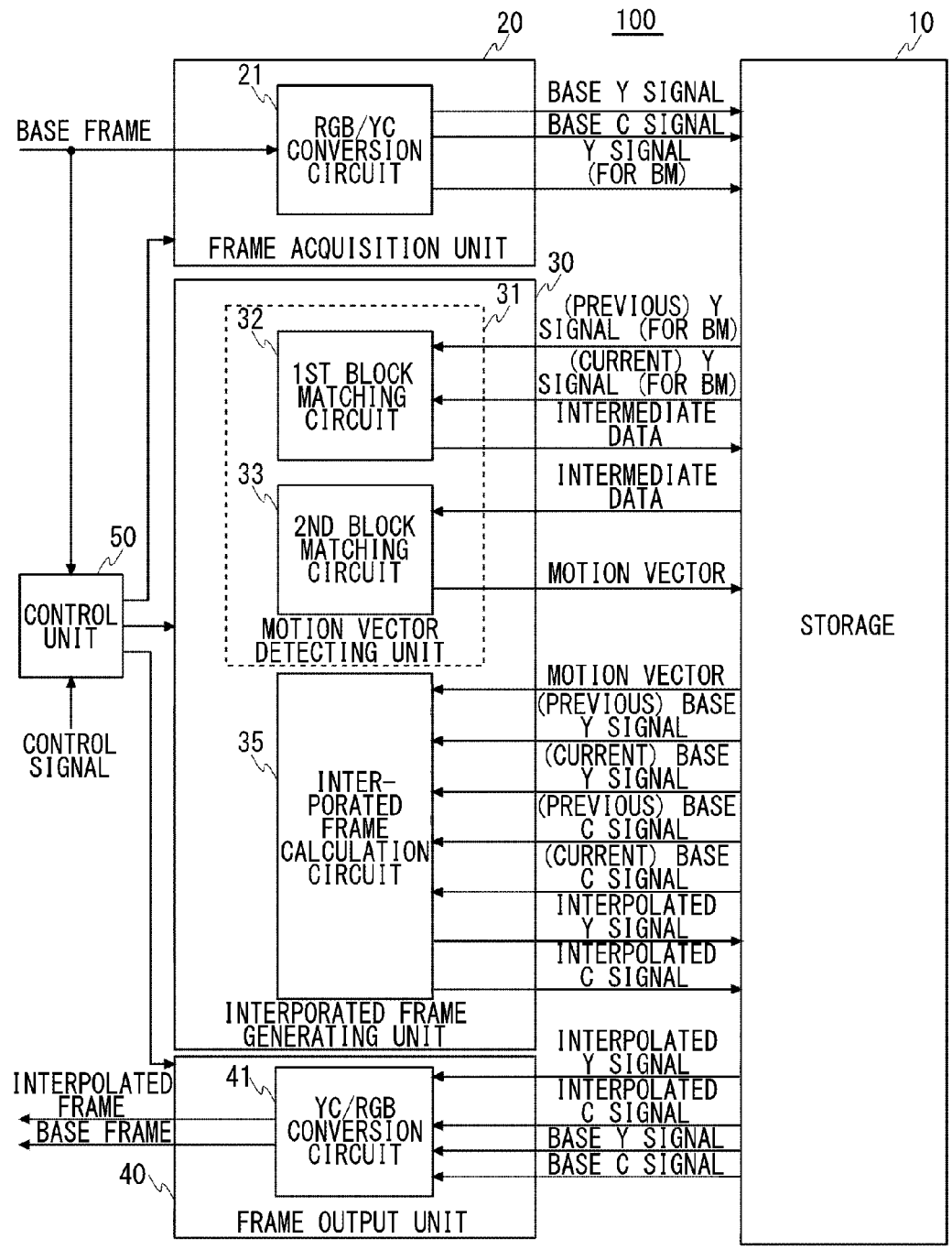
FIG. 2 shows a structure of a frame interpolation apparatus according to an embodiment.

FIG. 2 shows a structure of the frame interpolation apparatus 100 according to an embodiment of the present invention. The interpolation apparatus 100 includes a storage 10, a frame acquisition unit 20, an interpolated frame generating unit 30, a frame output unit 40, and a control unit 50. The frame acquisition unit 20, the interpolated frame generating unit 30 and the frame output unit 40 operate in parallel with one another so as to execute pipeline processing.

The storage 10 can be constituted by SDRAM. Note that the storage 10 may be provided external to the frame interpolation apparatus 100. The frame acquisition unit 20. The frame acquisition unit 20, the interpolated frame generating unit 30 and the frame output unit 40 each can be configured by a logic circuit where a wide variety of arithmetic units and/or registers are combined. The logic circuit includes a work area configured by a static random access memory (SRAM) and the like. The control unit 50 can be configured by a logic circuit or a digital signal processor (DSP).

The storage 10 stores frames temporarily. More specifically, the storage 10 stores base frames inputted from the exterior and interpolated frames generated by the interpolated frame generating unit 30. The storage 10 also stores intermediate data (e.g., motion vector) generated in the middle of computing the interpolated frames.

The frame acquisition unit 20 writes frames that constitute the moving images inputted from the exterior, to the storage 10. More specifically, the frame acquisition unit 20 samples a frame from the moving images inputted from the image generating apparatus 300 in cycles of (n+1) frames. In the present embodiment, the frame acquisition unit 20 samples a frame for every four sequential frames, for instance.

It is assumed in the present embodiment that frame data inputted to the frame acquisition unit 20 are defined by RGB primary color signals. The frame acquisition unit 20 includes an RGB/YC conversion circuit 21. The RGB/YC conversion circuit 21 converts the RGB primary color signals inputted, into luminance signal Y and color-difference signals Cb and Cr so as to write them to the storage 10. In so doing, the amount of data can be compressed. For example, RGB primary signals of 4:4:4 may be converted into luminance signal Y and color-difference signals Cb and Cr of 4:2:2.

In what is to follow, luminance signal Y is simply denoted by "Y signal(s)" and two color-difference signals Cb and Cr are denoted collectively by "C signal". Also, Y signal and C signal of base frame are denoted by "base Y signal" and "base C signal", respectively, whereas Y signal and C signal of interpolated frame are denoted by "interpolated Y signal" and "interpolated C signal", respectively.

In the present embodiment, the RGB/YC conversion circuit 21 generates Y signals for block matching and writes the thus generated Y signals to the storage 10. For example, the RGB/YC conversion circuit 21 generates a Y signal, with an increased resolution, where a signal with a pixel precision of less than one pixel (e.g., ½ pixel precision, ¼ pixel precision) is interpolated. Use of this Y signal allows motion compensation with a pixel precision of less than one pixel and achieves a higher-precision detection of motion vector. Note that the signals with a pixel precision of less than one pixel can be generated through filter processing using a 6-tap FIT filter or the like.

The interpolated frame generating unit 30 generates an interpolated frame between frames sampled by the frame acquisition unit 20. More specifically, the interpolated frame generating unit 30 reads a plurality of base frames from the storage 10, generates an interpolated frame between these frames, and writes the interpolated frame to the storage 10. In the present embodiment, the interpolated frame generating unit 30 reads two base frames from the storage 10, generates an interpolated frame between the two base frames, and writes the interpolated frame to the storage 10. The interpolated frame generating unit 30 includes a motion vector detecting unit 31 and an interpolated frame calculation unit 35.

The motion vector detecting unit 31 detects a block-by-block or pixel-by-pixel motion vector. In the present embodiment, a pixel-by-pixel motion vector is detected by two-step block matching.

The motion vector detecting unit 31 includes a first block matching circuit 32 and a second block matching circuit 33. The first block matching circuit 32 reads, from the storage 10, Y signals for block matching of the current frame and the preceding frame, which are to be the aforementioned two base frames. The first block matching circuit 32 then divides the preceding frame into a plurality of blocks (e.g., 8×8 or 16×16 macroblocks), and searches a block that matches each of the plurality of blocks or a block that has a minimum difference (error) therefrom, within the current frame.

For example, the sum of absolute differences or the sum of squared differences between pixels, of the corresponding positions, contained in both a target block in the preceding frame and candidate blocks in the current frame is computed between the target block and the candidate blocks. Then, a candidate block having the minimum value is identified as an optimum prediction block in the current frame. Or, each pixel contained in the target block in the preceding frame is compared with a pixel of the corresponding position in the candidate blocks in the current frame, and a candidate block having a largest number of practically matched pixels in the corresponding position may be identified as the optimum prediction block in the current frame.

The first block matching circuit 32 computes a motion vector between each block in the preceding frame and each optimal prediction block in the current frame. Thereby, block-by-block motion vectors can be detected. The first block matching circuit 32 writes the computation results to the storage 10 as intermediate data.

The second block matching circuit 33 reads, from the storage 10, the intermediate data written by the first block matching circuit 32, and computes the motion vectors of pixels, whose pixel values have not practically matched, between each block in the preceding frame and each optimum prediction block in the current frame. For example, using a method similar to the aforementioned method, an area which has been matched or has a minimum difference (error) relative to the area of a pixel, whose pixel value in each block of the preceding frame has not practically matched, are searched within the current frame. Thereby, pixel-by-pixel motion vectors between the preceding frame and the current frame can be detected. The second block matching circuit 33 writes the pixel-by-pixel motion vectors to the storage 10.

Figure 3:
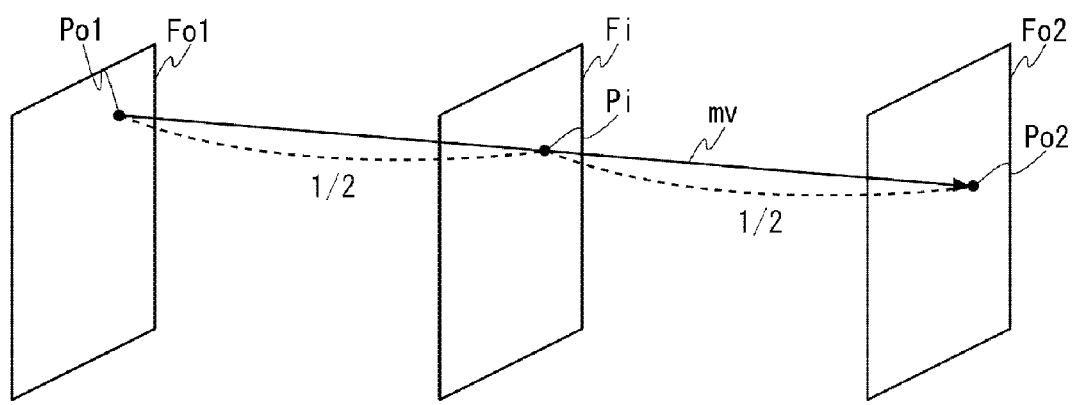
FIG. 3 shows how an interpolated frame is generated (double speed conversion)

The interpolated frame calculation unit 35 identifies the motion vector passing through each pixel within an interpolated frame, and combines each pixel of the preceding frame corresponding to the starting point of the motion vector and each pixel of the current frame corresponding to the ending point thereof so as to generate each pixel with the interpolated frame. Referring to FIG. 3, a description is now given of a method for generating the pixels within the interpolated frame.

FIG. 3 is a diagram showing a principle of generating an interpolated frame (double speed conversion). In the double speed conversion, one interpolated frame Fi needs to be inserted between a first base frame Fo1 and a second base frame Fo2. The interpolated frame Fi is inserted at the temporal position where a time duration between the first base frame Fo1 and the second base frame Fo2 is divided in half.

A pixel Pi of the interpolated frame Fi is generated in such a manner that a pixel Po1 of the first base frame Fo1 corresponding to the starting point of a motion vector my passing through the pixel Pi and a pixel Po2 of the second base frame Fo2 corresponding to the ending point of the motion vector my passing through the pixel Pi are combined. For example, the value of the pixel Pi of the interpolated frame Fi may be calculated by averaging the pixel Po1 and the pixel Po2.

In this case, if the motion vector my passing through the pixel Pi of the interpolated frame Fi can be accurately obtained, the pixel Po1 of the first base frame Fo1 corresponding to the starting point of the motion vector my may be directly assigned to the pixel Pi of the interpolated frame Fi. Nevertheless, if the motion vector my is erroneously detected, only one of the pixels Po1 and Po2, namely pixel Po1 only, can be referenced, so that large noise will be likely to occur. Thus, in the present embodiment, both the pixel Po1 of the first base frame Fo1 and the pixel Po2 of the second base frame Fo2 are referenced.

When there is no motion vector passing through a target pixel of the interpolated frame Fi, the following processing may be performed, for instance. That is, a pixel spatially interpolated from its peripheral pixels in the interpolated frame Fi is assigned to the target pixel. Or, a pixel obtained by combining a pixel of the first base frame Fo1 and a pixel of the second base frame Fo2 is assigned to the target pixel wherein the position of the pixel of the first base frame Fo1 and the pixel of the second base frame Fo2 is identical to the position of the target pixel of the interpolated frame Fi.

Referring back to FIG. 2, the interpolated frame calculation unit 35 reads, from the storage unit 10, base Y signals and base C signals of the preceding frame, base Y signals and base C signals of the current frame, and motion vectors between the preceding frame and the current frame. The interpolated frame calculation unit 35 generates an interpolated frame using the above-described method, and writes interpolated Y signals and interpolated C signals of the thus generated interpolated frame to the storage 10.

The frame output unit 40 reads base frames and an interpolated frame from the storage 10 and outputs them to the exterior (the display unit 400 in the present embodiment) in display order. The frame output unit 40 includes a YC/RGB conversion circuit 41. The YC/RGB conversion circuit 41 reads interpolated Y signals and interpolated C signals from the storage 10, converts them into RGB primary color signals, and outputs the converted signals to the exterior as an interpolated frame. Also, the YC/RGB conversion circuit 41 reads base Y signals and base C signals from the storage 10, converts them into RGB primary color signals, and outputs the converted signals to the exterior as a base frame.

The control unit 50 integrally controls the frame interpolation apparatus 100 as a whole. The detailed structure and operation of the control unit 50 according to the present embodiment will be described later.

A description is now given of a basic operation of the frame interpolation apparatus 100 according to an embodiment. The frame acquisition unit 20, the interpolated frame generating unit 30 and the frame output unit 40 operate in shorter cycles than those in which a frame to be processed by the frame acquisition unit 20 is inputted. Here, the "frame to be processed" means a frame to be actually used, without being discarded, for display and for reference when an interpolated frame is to be generated. Hereinbelow, a description will be given of an example where (1) frames are inputted to the frame acquisition unit 20 at a frequency of 15 Hz, and (2) the frame acquisition unit 20, the first block matching circuit 32, the second block matching circuit 33, the interpolated frame calculation unit 35, and the frame output unit 40 each operate at a frequency of 60 Hz.

Figure 4:
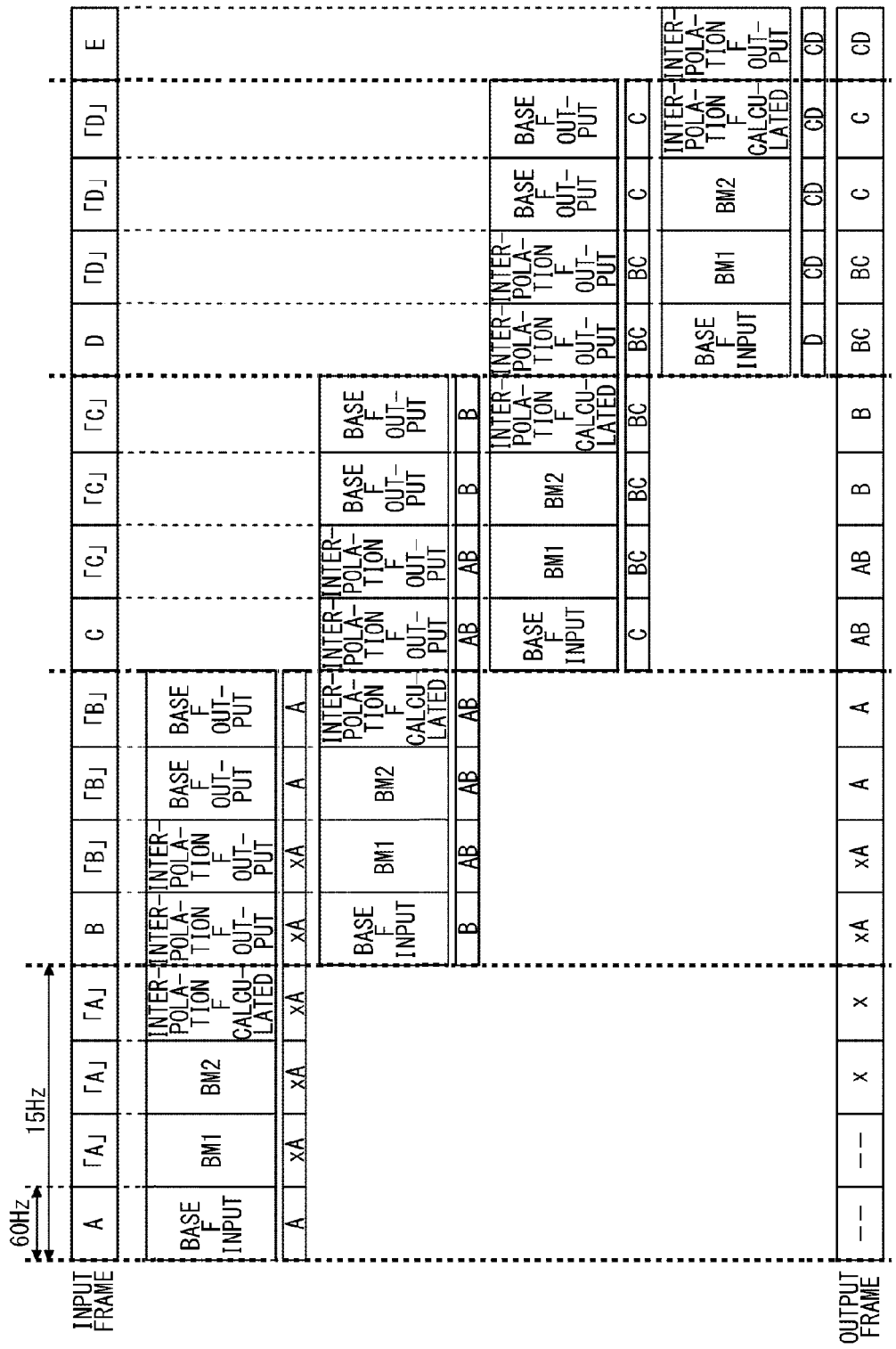
FIG. 4 is a timing chart showing a basic operation of a frame interpolation apparatus according to an embodiment.

In the present embodiment, the operation timings of the frame acquisition unit 20 and the interpolated frame generating unit 30 are set in such a manner that the timing with which to write a base frame to the storage 10 by the frame acquisition unit 20 and the timing with which to write an interpolated frame to the storage 10 by the interpolated frame generating unit 30 are made to differ from each other. Referring to FIG. 4, a description will be given of concrete operation timings of the frame acquisition unit 20, the interpolated frame generating unit 30 and the frame output unit 40.

The interpolated frame generating unit 30 completes an interpolated frame generating process during a period of time after an input period of a target frame inputted to the frame acquisition unit 20 and then written to the storage 10 has ended but before the input period of the next frame starts. This interpolated frame generating process includes at least reading the target frame from the storage 10, generating an interpolated frame by at least referencing the target frame, and writing the thus generated interpolated frame to the storage 10. The interpolated frame is an interpolated frame to be inserted before the target frame. The interpolated frame generating unit 30 may generate the interpolated frame by referencing the target frame and a frame immediately before the target frame, referencing the target frame and a frame which is located anterior to the target frame by a distance equivalent to two or more frames, or referencing the target frame and a plurality of frames anterior to the target frame.

FIG. 4 is a timing chart showing a basic operation of the frame interpolation apparatus 100 according to an embodiment. In this example, frames received at a frequency of 15 Hz by One Seg broadcasting are subjected to a simple duplicating process performed by the copying unit 330 of the image generating apparatus 300, so that the number of frames is increased four times. Then, the frames the number of which has been increased four times are inputted to the frame interpolation apparatus 100.

In FIG. 4, four identical successive frames A are inputted and then four identical successive frames B are inputted followed by four identical successive frames C. Similarly, the frames C are followed by the identical successive frames D which are followed by frames E, and so forth. The interpolation generating frame 30 generates an interpolated frame between frame A and Frame B, generates an interpolated frame between frame B and Frame C, generates an interpolated frame between frame C and frame D, and so forth. As a result, the moving images inputted are subjected to a double speed conversion.

The frame acquisition unit 20 keeps one of the four identical successive frames and discards the rest of three frames. Here, a first frame is subjected to input processing while the three remaining frames are discarded.

During a period of time after an input period (base F input (A)) of a target frame (A) inputted to the frame acquisition unit 20 and then written to the storage 10 has ended but before the input period (base F input (B)) of the next frame (B) starts, the interpolated frame generating unit 30 completes a series of the following three processes. The interpolated frame generating unit 30 completes (i) a process of reading the target frame (A) and a frame (x) preceding the target frame (A) from the storage 10, (ii) a process of generating an interpolated frame (xA) between the target frame (A) and the preceding frame (x), and (iii) a process of writing the thus generated interpolated frame (xA) to the storage 10. That is, a first matching period (BM1(xA)) of the first matching circuit 32, a second matching period (BM2(xA)) of the second matching circuit 33 and a calculation period (interpolation F calculated (xA)) of the interpolated frame calculation unit 35 are so set as to be contained within the period of time after the input period (base F input (A)) of the target frame (A) has ended but before the input period (base F input (B)) of the next frame (B) starts.

During the period of time from when the input period (base F input (B)) has started until when an input period (base F input (C)) of the next frame (C) starts, the frame output unit 40 reads the interpolated frame (xA) and the target frame from the storage 10 in this order and outputs them to the exterior. In this case, the two identical interpolated frames (xA) are first outputted and then the two identical target frames (A) are outputted.

The input period (base F input (B)) of the next frame (B) by the frame acquisition unit 20, the first matching period (BM1 (AB)) by the first block matching circuit 32, the second matching period (BM2(AB)) by the second block matching circuit 33 and the calculation period (interpolation F calculated (AB)) by the interpolated frame calculation unit 35 are set in parallel with output periods (interpolation F output (xA), interpolation F output (xA), base F output (A), base F output (A)) of the interpolated frame (xA) and the target frame (A) by the frame output unit 40. Thereby, the pipeline processing is executed. Then, the subsequent frames C, D, E and so forth are processed similarly.

By performing the above-described operation examples, when the interpolated frames are inserted into the base frames by hardware processing, the load on memory can be reduced while the real-timeliness is assured. That is, the pipeline processing is executed by operating the frame acquisition unit 20, the interpolated frame generating unit 30 and the frame output unit 40 in parallel, so that the real-timeliness can be assured.

Also, the operation timings of the frame acquisition unit 20 and the interpolated frame generating unit 30 are set in such a manner that the timing with which to write a base frame to the storage 10 by the frame acquisition unit 20 and the timing with which to write an interpolated frame to the storage 10 by the interpolated frame generating unit 30 are made to differ from each other. Thus, the maximum load on the storage 10 can be reduced.

More specifically, the amount of data accessed to the storage 10 gets large during the input period (base F input) by the frame acquisition unit 20 and during the calculation period (interpolation F calculated) by the interpolated frame calculating unit 35. That is, when the base frame is to be written to the storage from the frame acquisition unit 20, both Y signal and C signal must be written thereto. Also, between the interpolated frame calculation unit 35 and the storage 10, the Y signal and C signal of each of a preceding frame and the current frame as well as the motion vectors of the preceding frame and the current frame need to be read out to the interpolated frame calculation unit 35 from the storage 10. In parallel with this, the Y signal and C signal of the interpolated frame need to be written to the storage 10 from the interpolated frame calculation unit 35.

Accordingly, the amount of data accessed to the storage 10 is relatively small during the first matching period (BM1) by the first block matching circuit 32 and the second matching period (BM2) by the second block matching circuit 33. This is because the signals transmitted between the first block matching circuit 32 and the storage 10 and those transmitted between the second block matching circuit 33 and the storage 10 are Y signals or motion vectors and therefore C signals are not transmitted therebetween.

Thus, an increase in the amount of data accessed to the storage 10 can be suppressed if the setting is done so that the input period (base F input) by the frame acquisition unit 20 and the calculation period (interpolation F calculated) by the interpolated frame calculation unit 35 should not be scheduled over the same period. In the operation example shown in FIG. 4, the setting is done so that the timings of the input period (base F input) and the calculation period (interpolation F calculated) be made to differ from each other. Also, for each unit operation period, the setting is done so that the input processing by the frame acquisition unit 20, the calculation processing by the interpolated frame calculation unit 35 and the output processing by the frame output unit 40 should not be performed with the same timing. As a result, the loads on the frame acquisition unit 20, the interpolated frame calculation unit 35 and the frame output unit 40 as a whole are leveled off.

A description has been given so far of the example where the four identical consecutive frames are inputted ideally to the frame interpolation apparatus 100 from the image generating apparatus 300. However, in practice, there are cases where the decoding frequency at the image generating apparatus 300 and the frame frequency of images outputted from the image generating apparatus 300 are not exactly in a 4-to-1 ratio due to some factors. Such factors include the fact that the frame frequency is intentionally shifted from 60 Hz in order to avoid the radio wave interference occurring on an image generating apparatus 300 side. Also, some applications decode the received moving images using software processing depending on the aforementioned application used by the display apparatus 500. In such applications, there are cases where the decoding processing and the other processings having a heavy workload are being processed simultaneously. If this is the case, the decoding processing may be delayed. In this manner, though the four consecutive frames should ideally be inputted, it is possible that three or five consecutive frames are sometimes inputted instead.

Figure 5:
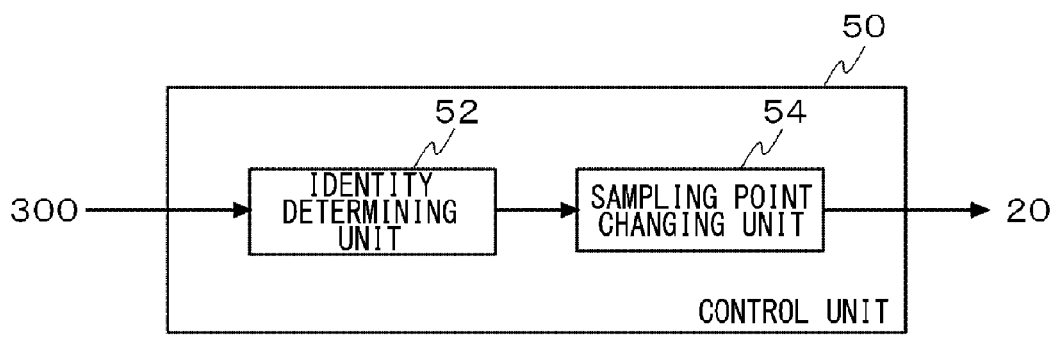
FIG. 5 is a diagram showing a structure of a control unit capable of handling 3-frame repetition and/or 5-frame repetition inputs according to an embodiment.

FIG. 5 is a diagram showing a structure of the control unit 50 capable of handling 3-frame repetition and/or 5-frame repetition inputs according to the present embodiment. The control unit 50 includes an identity determining unit 52 and a sampling point changing unit 54.

The identity determining unit 52 determines the identity of successive frames of moving images inputted from the image generating apparatus 300. A description of a concrete example of this identity determination will be given later.

The sampling point changing unit 54 shifts the sampling point adaptively while keeping the aforementioned cycles when there is a succession of less than or more than (n+1) frames (four frames according to the present embodiment) determined to be identical by the identity determining unit 52 (e.g., 3 or 5 frames).

(5-Frame Repetition Input)

Hereinbelow, a description will be given of an operation when there is a succession of five identical frames in moving images supplied from the image generating apparatus 300. The sampling point changing unit 54 delays the sampling point by at least one frame in time when there is a succession of more than four frames determined to be identical by the identity determining unit 52 (five frames in this operation example) and the same frame is sampled repeatedly.

Figure 6:
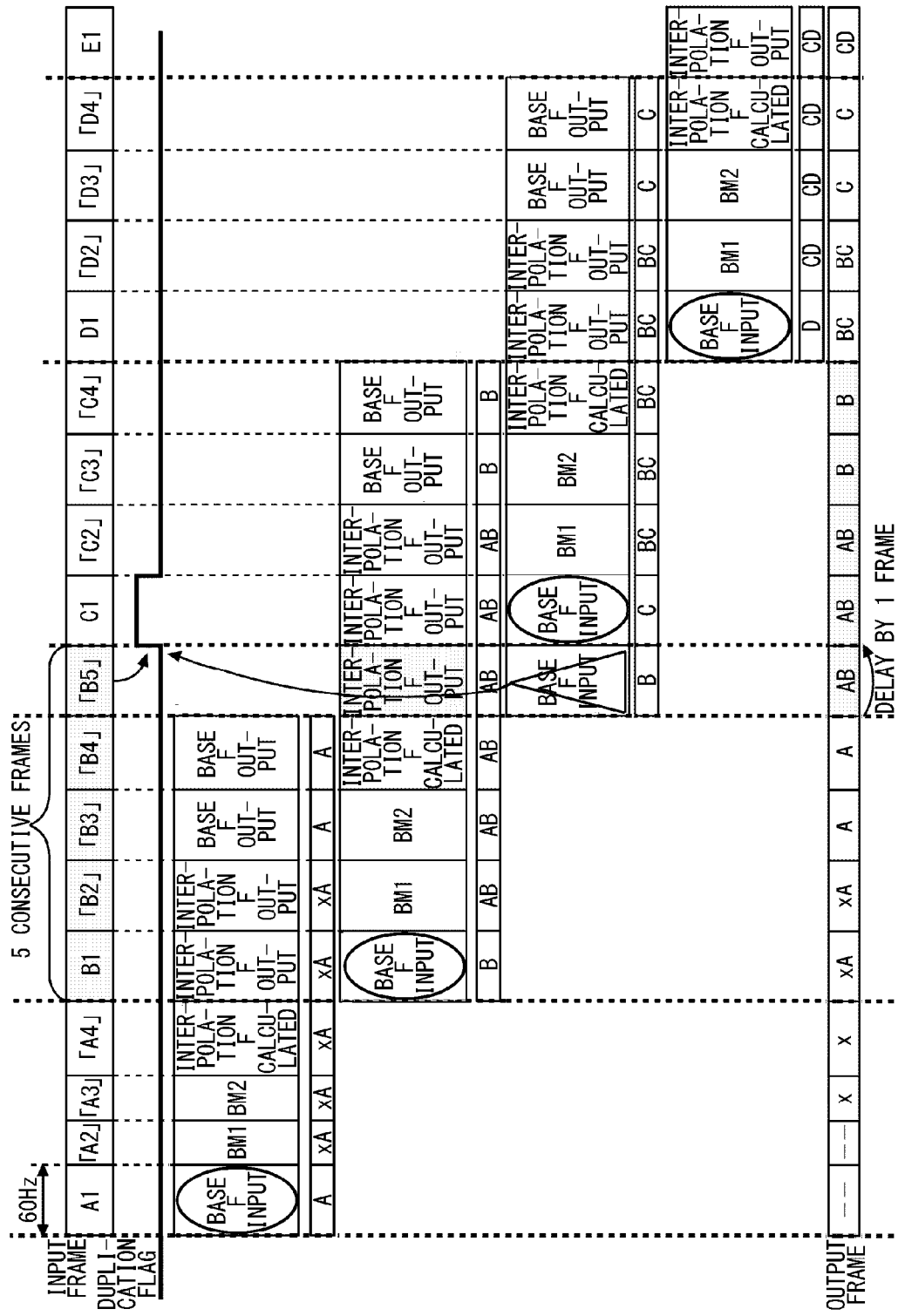
FIG. 6 is a timing chart showing an example of operation handling a 5-frame repetition input by a frame interpolation apparatus according to an embodiment.

FIG. 6 is a timing chart showing an example of operation handling a 5-frame repetition input by the frame interpolation apparatus 100 according to the present embodiment. Note that the timing chart of FIG. 6 is based on the timing chart of FIG. 4. The following explanation touches mainly on the differences between the two. It should be noted that the input frames A1, A2, A3, and A4 are all identical frames. A pair of brackets composed of a half-width left corner bracket and a half-width right corner bracket shown in FIG. 6, FIG. 7, and FIG. 11 to FIG. 13, indicate that the frame in the brackets is a copy frame duplicated by the copying unit 330 of the image generating apparatus 300. The numbers represent the input sequence. The same applies to the frames B and the subsequent frames and to the input frames of FIG. 7 to be discussed later.

Note also that the circled input period (base F input) in FIG. 6 is one in which a base frame is sampled and the base frame is used to calculate a motion vector, generate an interpolated frame, and produce an output to the display unit 400. The input period (base F input) in a triangle is one in which a base frame is sampled, but the base frame is overwritten with the base frame that is sampled in the following circled input period (base F input).

In FIG. 6, five frames B are inputted consecutively. In this operation example, when the identity determining unit 52 detects the succession of five identical frames and detects that the fifth frame is one at a sampling point, the identity determining unit 52 sets a flag (hereinafter referred to as "duplication flag") in the next frame period. Once this duplication flag is set, the sampling point changing unit 54 shifts the sampling point to the flagged period. The sampling cycle, which is essentially fixed, is changed in an exceptional move when this duplication flag is set.

After sampling frame B1, the frame acquisition unit 20 samples, four frames later, frame B5, which turns out to be the same frame B. At the completion of detecting the fifth frame, it can be judged that the same frame (frame B here) has been repeated at least five times. Now, based on this judgment, the next frame C1 becomes a candidate for a duplication flag. Also, since the frame preceding the frame C1 is positioned at the sampling frame of the base frame input period (base F input), the result is the sampling of frame B, which has been repeated five times, twice consecutively. Thus, based on this result, the duplication flag is finally set at the position of frame C1. Once this duplication flag is set, the frame acquisition unit 20 samples the frame of the flagged period irrespective of the 4-frame sampling cycle. In the present example, the frame acquisition unit 20 samples frame C1. After this, the 4-frame sampling cycle resumes with this sampling point as a new starting point.

As described above, when the frame acquisition unit 20 has sampled the same frame twice consecutively, the processing for the period sampled for the second time is treated as practically invalid. That is, frame B5 sampled for the period is discarded. Although the frame output unit 40 outputs interpolated frame AB, which is for frame A and frame B, externally, this external output is not counted as valid output. In other words, the interpolated frame AB is externally outputted twice consecutively after the sampled period. A user sees the interpolated frame AB one frame longer, but recognizes practically no adverse effect on visibility.

Even when the same frame is detected five times consecutively, a duplication flag will not be set if the sampling point is not at the frame preceding one to which the duplication flag is to be set. In such a case, there will be no change in sampling point, with the sampling cycle maintained in the same repetition timing.

(3-Frame Repetition Input)

Hereinbelow, a description will be given of an operation when there is a succession of three identical frames in moving images supplied from the image generating apparatus 300. The sampling point changing unit 54 advances the sampling point by at least one frame in time when there is a succession of less than four frames determined to be identical by the identity determining unit 52 (three frames in this example) and a desired frame cannot be sampled within a cycle. In this case, it is preferable that the sampling point changing unit 54 advances the sampling point in time such that there results a lag between the timing of the frame acquisition unit writing a base frame to the storage 10 and the timing of the interpolated frame generating unit 30 writing an interpolated frame to the storage 10.

Figure 7:
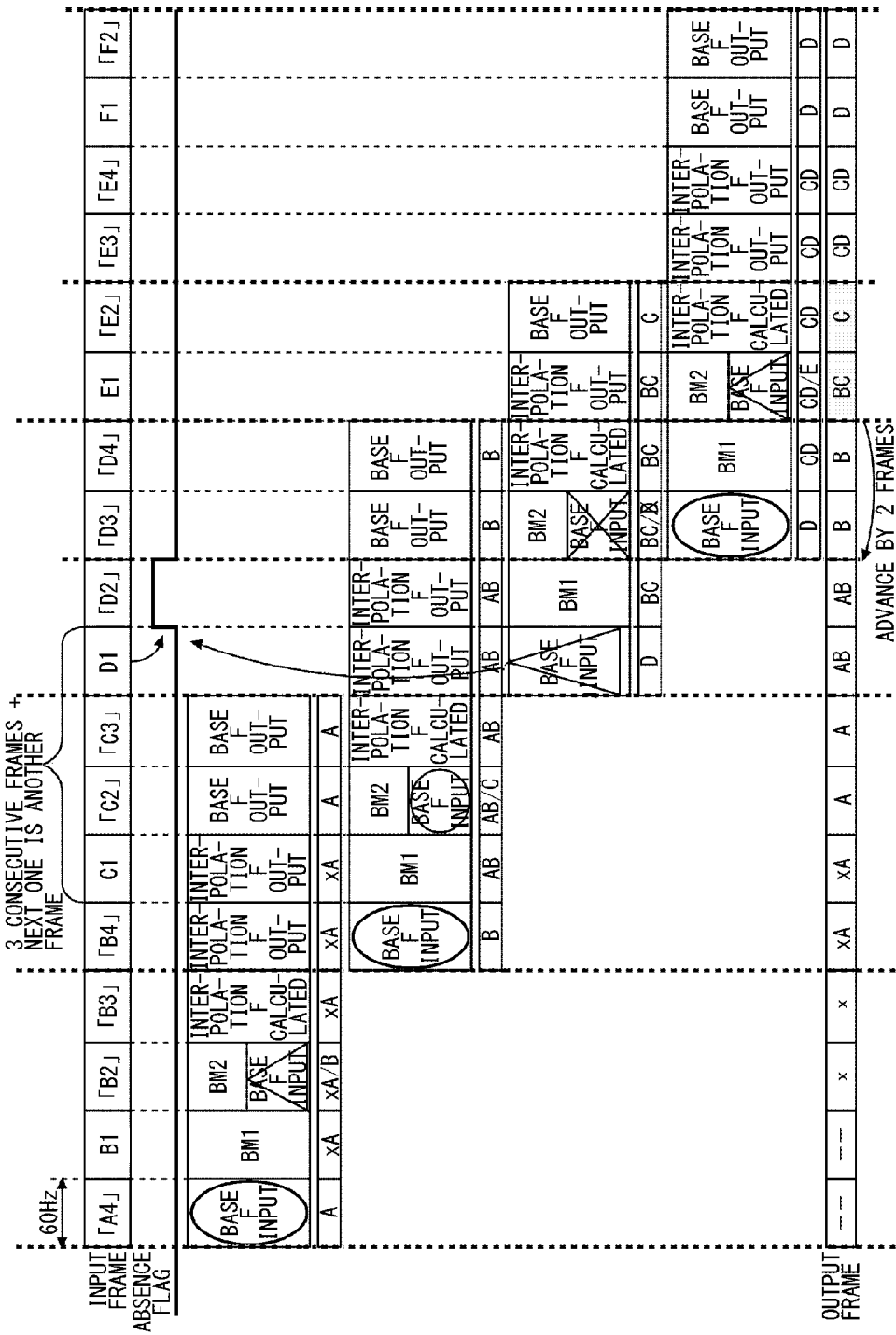
FIG. 7 is a timing chart showing an example of operation handling a 3-frame repetition input by a frame interpolation apparatus according to an embodiment.

FIG. 7 is a timing chart showing an example of operation handling a 3-frame repetition input by the frame interpolation apparatus 100 according to the present embodiment. Note that the timing chart of FIG. 7 is based on the timing chart of FIG. 4. The following explanation touches mainly on the differences between the two. In the timing chart of FIG. 4, the first frame is sampled from four identical frames inputted consecutively. The description using the timing chart of FIG. 7 is of a case in which a fourth frame is sampled. In addition, a second frame is sampled in advance as a temporary frame. More specifically, in parallel with a second matching processing by the second block matching circuit 33, the frame acquisition unit 20 samples the temporary frame and inputs the sampled temporary frame to the storage 10 or another temporary storage. That is, the second matching period (BM2) and the input period (base F input) of a base frame (temporary frame) are set at the same time.

Note that the input periods (base F input) in circles and triangles in FIG. 7 are equivalent to those in FIG. 6. No sampling is performed in the crossed-out input period (base F input).

In FIG. 7, three frames C are inputted consecutively. In this operation example, when the identity determining unit 52 detects the succession of three identical frames and the following frame changing into another frame and detects that the frame following the three-frame repetition is one at a sampling point, the identity determining unit 52 sets a flag (hereinafter referred to as "absence flag") in the next frame period. Once this absence flag is set, the sampling point changing unit 54 shifts the sampling point to the frame period following the flagged one. In the timing chart of FIG. 7, the sampling point is advanced two frames in time.

After sampling frame B1, the frame acquisition unit 20 samples, four frames later, frame D1. This is because frame C is repeated only three times. At the completion of input of another frame after the succession of three identical frame, the identity determining unit 52 can determine that a succession of identical frames has completed at three frames. Now, based on this determination, the next frame D2 becomes a candidate for an absence flag. Also, since frame D1 preceding this frame D2 is positioned at the sampling frame of the base frame input period (base F input), the result is that no sampling is made of the three consecutive frames C. Thus, based on this result, the absence flag is finally set at the position of frame D2. Once this absence flag is set, the frame acquisition unit 20 samples frame D3, which is the frame following this flagged period, irrespective of the 4-frame sampling cycle. Yet, no sampling is made of frame D3, which is a temporary frame. After this, the 4-frame sampling cycle resumes with this sampling point as a new starting point.

Once the absence flag is set, the first block matching circuit 32 performs a first matching processing using a temporary frame without using the frame sampled immediately before that point. In this example, the first block matching circuit 32 performs the first matching processing between frame B and frame C, not using frame D1 sampled immediately before that point, but using a temporary frame C2 sampled two unit periods previously. Subsequent to that, the second matching processing by the second block matching circuit 33 is also performed between frame B and frame C, and the interpolated frame calculation processing by the interpolated frame calculation unit 35 is also performed between frame B and frame C. The output processing by the frame output unit 40 subsequent to that, unlike the normal process, outputs one each of the interpolated frame BC between frame B and frame C and the base frame C externally. The user sees the interpolated frame BC and the base frame C one frame shorter, but recognizes practically no adverse effect on visibility.

Note that even when the succession of three identical frames and the following frame changing into another frame are detected, the duplication flag will not be set if the sampling point is not at the frame preceding the frame with the absence flag set. In such a case, the sampling point is not changed, and the previous sampling cycle is maintained.

In the timing chart of FIG. 7, there is no overlap between the timing of the frame acquisition unit 20 writing a base frame to the storage 10 and the timing of the interpolated frame generating unit 30 writing an interpolated frame to the storage 10. Thus, in the timing chart of FIG. 7, the 3-frame repetition input is handled while retaining the real-timeliness and preventing load increase of the storage 10.

(Mixture of 3-Frame Repetition Input and 5-Frame Repetition Input)

FIGS. 8A to 8D are diagrams showing an example in which 3-frame repetition input, 4-frame repetition input, and 5-frame repetition input are contained in a cyclic way in the moving images supplied from the image generating apparatus 300 before the capacity to handle the 5-frame repetition input is installed. In each of FIGS. 8A to 8D, the upper row shows input frames to the frame interpolation apparatus 100, and the lower row shows output frames from the frame interpolation apparatus 100. The blocks with two lower-case letters in the lower row are interpolated frames. The blocks on the right of the vertical dotted lines are each a sampling point.

Figure 8A:
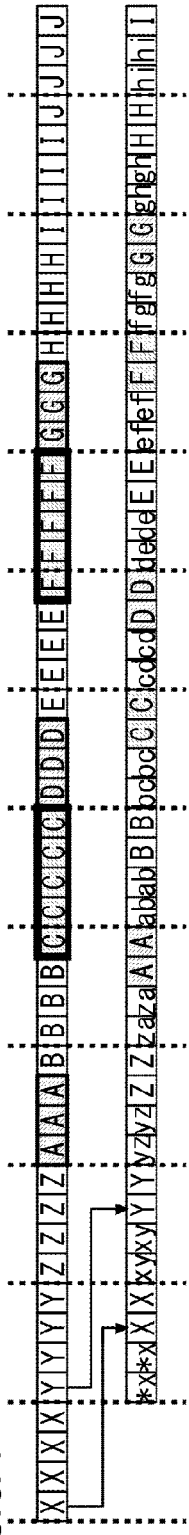
FIGS. 8A to 8D are diagrams showing an example in which 3-frame repetition input, 4-frame repetition input, and 5-frame repetition input are contained in a cyclic way in moving images supplied from an image generating apparatus before the capacity to handle a 5-frame repetition input is installed.

In FIG. 8A, frames X, Y, and Z are inputted 4 times each, but, from A onward, 3-frame repetition input, 4-frame repetition input, and 5-frame repetition input are repeated cyclically. This cyclic phenomenon can be observed as a result of radio wave interference to the image generating apparatus 300, load variation in the image generating apparatus 300 or the like. It is to be noted that this phenomenon occurs randomly. In FIG. 8D, 4-frame repetition input is restored from frame H onward. The sampled base frame is outputted 6 frames behind. When 3-frame repetition input, 4-frame repetition input, and 5-frame repetition input occur cyclically, the double speed conversion by the frame interpolation apparatus 100 is executed properly with the same accuracy as when 4-frame repetition input continues.

Figure 8B:
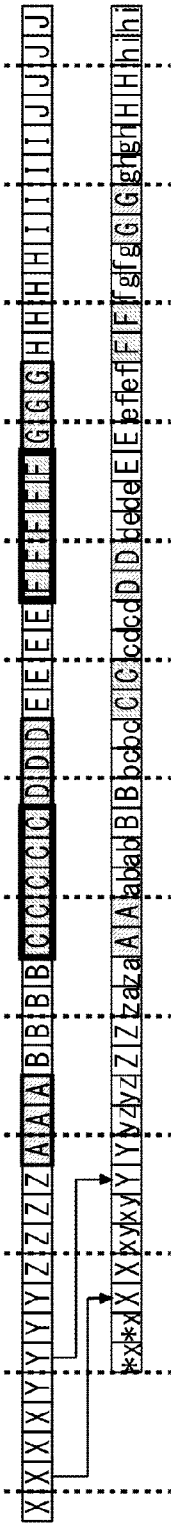
Figure 8C:
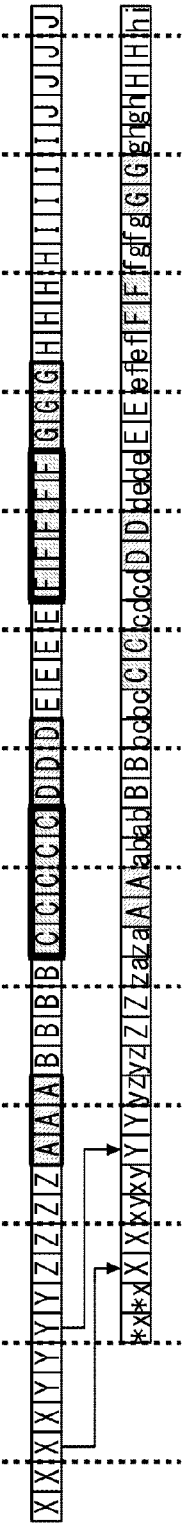
Figure 8D:
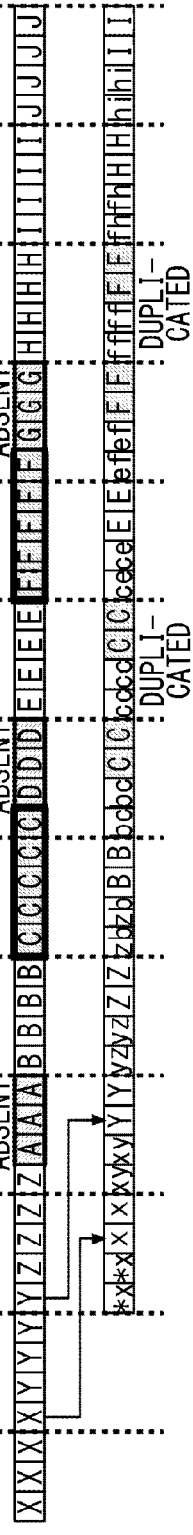

FIG. 8B shows a case where frames are inputted in the same pattern as in FIG. 8A, but the sampling point is one frame behind. In this case, too, the double speed conversion by the frame interpolation apparatus 100 is executed properly with the same accuracy as when 4-frame repetition input continues. FIG. 8C shows a case where frames are inputted in the same pattern as in FIG. 8A, but the sampling point is two frames behind. In this case, too, the double speed conversion by the frame interpolation apparatus 100 is executed properly with the same accuracy as when 4-frame repetition input continues.

FIG. 8D shows a case where frames are inputted in the same pattern as in FIG. 8A, but the sampling point is three frames behind. In this case, the frames of 3-frame repetition input misses the sampling point, so that those frames become absent frames. In FIG. 8D, frames A, D, G, and J are absent frames. Also, the frames of 5-frame repetition, which are sampled twice, become duplicated frames. In FIG. 8D, frames C, F, and I are duplicated frames. In FIG. 8D, the accuracy of the double speed conversion by the frame interpolation apparatus 100 drops.

Figure 9A:
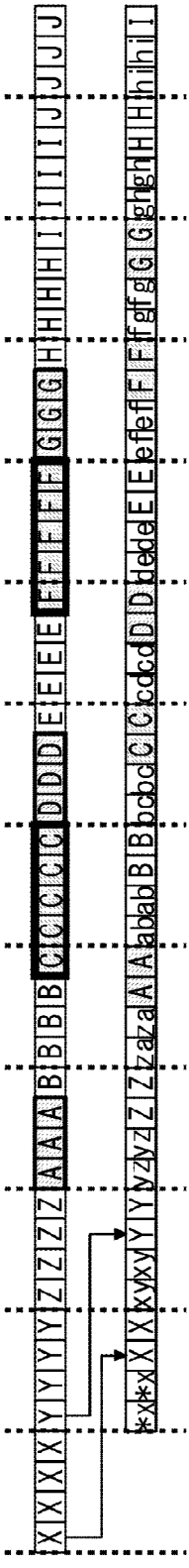
FIGS. 9A to 9D are diagrams showing an example in which 3-frame repetition input, 4-frame repetition input, and 5-frame repetition input are contained in a cyclic way in moving images supplied from an image generating apparatus after the capacity to handle a 5-frame repetition input is installed.
Figure 9B:
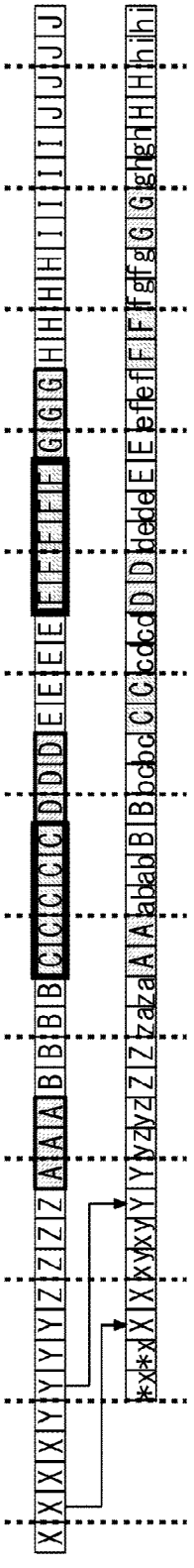
Figure 9C:
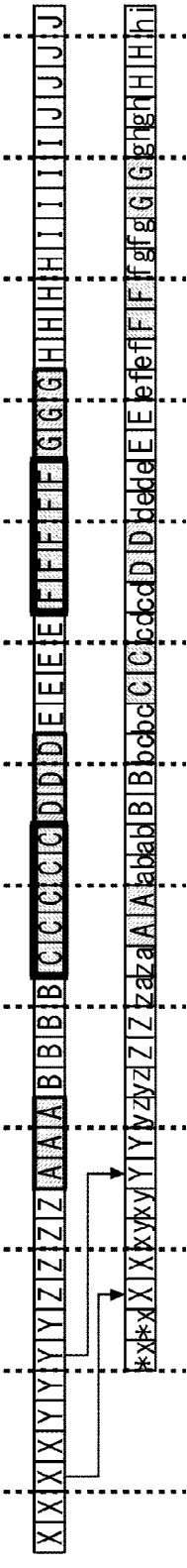

FIGS. 9A to 9D are diagrams showing an example in which 3-frame repetition input, 4-frame repetition input, and 5-frame repetition input are contained in a cyclic way in the moving images supplied from the image generating apparatus 300 after the capacity to handle the 5-frame repetition input is installed. FIGS. 9A to 9C are similar to FIGS. 8A to 8C.

Figure 9D:
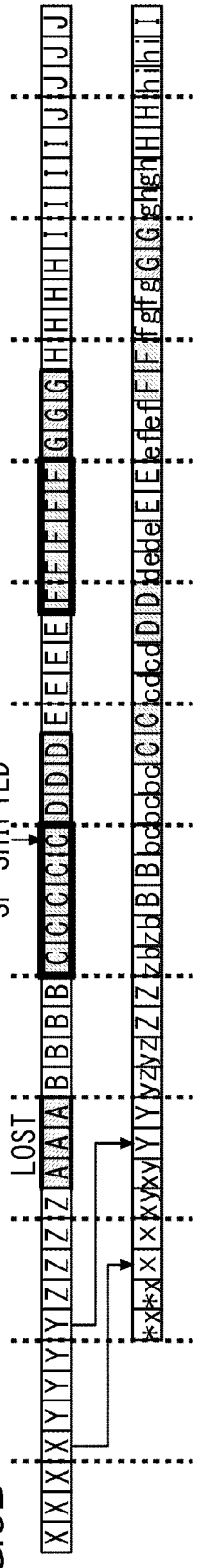

In FIG. 9D, the absence of frame A of 3-frame repetition input that occurs in the beginning cannot be prevented, but the sampling point (SP) is delayed by one frame in response to the detection of a 5-frame repetition input that occurs first. As a result, there will be no absence nor duplication thereafter.

With the above-described capacity to handle 3-frame repetition input installed, too, it will be possible to prevent the absence of frame A of 3-frame repetition input that occurs in the beginning. However, as already discussed, in handling 3-frame repetition input, it is necessary to retain a temporary frame and increase the memory size. On the other hand, such things are not required in handling 5-frame repetition input. Therefore, it is, in fact, easier for the frame interpolation apparatus 100 to handle 5-frame repetition input than 3-frame repetition input.

(Identity Determination)

Next, a description will be given of the determination processing of identity between frames by the identity determining unit 52. The identity determining unit 52 determines identity between frames by calculating the sum total of pixel values in each frame of moving images inputted from the image generating apparatus 300. The identity of frames is determined when the sum total of pixel values is in agreement or within a predetermined range of set values. The frame to be used as the foundation for pixel value calculation may be one before RGB/YC conversion or one after the conversion. Or it may be one with Y signals alone. In such a case, the determination accuracy may drop, but the amount of calculation can be reduced.

Or when the frames inputted from the image generating apparatus 300 have a superposition of OSD, the identity determining unit 52 calculates the sum total of pixel values of each frame from the regions thereof which are at least free of the superposed OSD.

Figure 10:
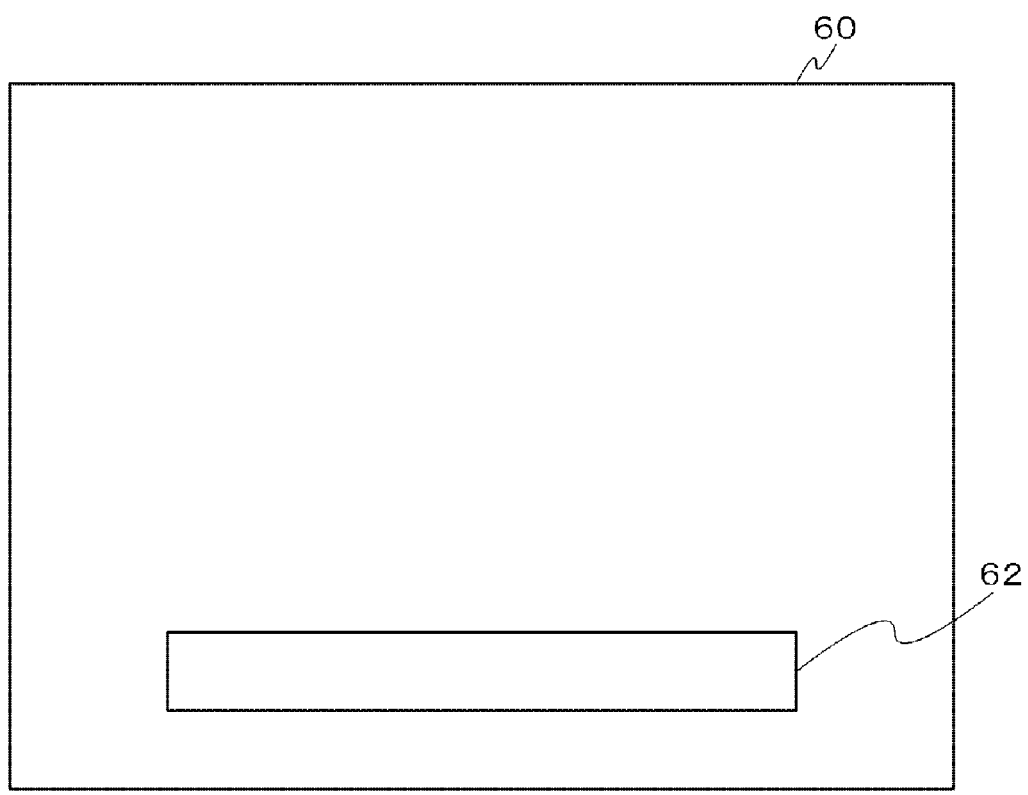
FIG. 10 shows a frame containing an OSD region, which is generated by an image generating apparatus, according to an embodiment.

FIG. 10 shows a frame 60 containing an OSD region, which is generated by the image generating apparatus 300, according to an embodiment of the present invention. An OSD region 62 is shown in this frame 60.

The OSD region 62 is subject to predetermined display position and size, depending on the type thereof. For example, sound volume information may be displayed in a lower part of the frame 60 as shown in FIG. 10, and channel information may be displayed in an upper left portion thereof.

Or the identity determining unit 52 may calculate the sum total of pixel values in a practically largest possible rectangular region derived from the regions of the frames which are at least free of superposed OSD. In this case, it becomes easier to turn the arithmetic circuit therefor into hardware.

As described thus far, according to the present embodiment, the sampling point can be shifted without changing the sampling rate when there occur interruptions in 4-frame repetition input. Thus, it is possible to prevent drops in image quality that can take place in frame interpolation.

The arrangements that may involve changing of sampling rate, on the other hand, may even cause a stop of sampling when the repetition count is falsely detected. Then it will be possible that the input images are not correctly reflected in the output images. According to the present invention, however, even when the repetition count is falsely detected, there will be no interruption in image output, and accurate frame interpolation will resume after the repetition count is detected correctly.

Also, in the above-described handling of 3-frame repetition input, it is possible to prevent the rise in bandwidth by setting the frame to be buffered as a temporary frame to a frame which is of a timing free of a rise in bandwidth.

The description of the present invention given above is based upon illustrative embodiments. These embodiments are intended to be illustrative only and it will be obvious to those skilled in the art that various modifications to constituting elements and processes could be further developed and that such additional modifications are also within the scope of the present invention.

In the above-described embodiments, a description has been given of an example in which there is an mixture of both 3-frame repetition input and 5-frame repetition input with 4-frame repetition input. Yet, the application is not limited thereto. For a simple combination of 4-frame repetition input and 5-frame repetition input or a simple combination of 4-frame repetition input and 3-frame repetition input, it is only necessary to employ the applicable repetition input handling.

More specifically, the copying unit 330 of the image generating apparatus 300 is set to operate at a frequency higher than the operating frequency for generating n units of copy frame (n being three frames in this example). For example, the copying unit 330 is set to operate at 60.2 Hz, which is higher than 60 Hz. The frame interpolation apparatus 100 receives moving images from the image generating apparatus 300 which is operating at a frequency higher than the operating frequency for generating n units of copy frame. As a result, the frame interpolation apparatus 100 receives input frames which are a combination of 4-frame repetition input and 5-frame repetition input. Thus, by employing the 5-frame repetition input handling only, it is possible to prevent any increase in circuit size and maintain the accuracy of double speed conversion.

Also, the copying unit 330 of the image generating apparatus 300 is set to operate at a frequency lower than the operating frequency for generating n units of copy frame (n being three frames in this example). For example, the copying unit 330 is set to operate at 59.8 Hz, which is lower than 60 Hz. The frame interpolation apparatus 100 receives moving images from the image generating apparatus 300 which is operating at a frequency lower than the operating frequency for generating n units of copy frame. As a result, the frame interpolation apparatus 100 receives input frames which are a combination of 3-frame repetition input and 4-frame repetition input. Thus, by employing the 3-frame repetition input handling only, it is possible to maintain the accuracy of double speed conversion.

In the above-described handling of 3-frame repetition input, a description has been given of a processing of advancing the sampling point by two frames. Yet, if a rise in bandwidth is acceptable, a processing of advancing the sampling point by one frame may be employed.

Also, in the above-described embodiments, a description has been given of a method of detecting motion vectors for individual pixels in two stages of block matching. However, the arrangement may be such that motion vectors passing individual pixels within an interpolated frame are obtained using motion vectors for individual blocks by one time of block matching. Also, instead of block matching, a gradient method may be used to detect motion vectors for individual pixels.

Also, in the above-described embodiments, a description has been given of an example in which the double speed conversion of One Seg images is realized by adding a frame interpolation apparatus 100 to an image generating apparatus 300. Yet, the arrangement may be such that the frame interpolation apparatus 100 is installed from the beginning in the image generating apparatus 300 in the place of the copying unit 330.

Also, in the above-described embodiments, a description has been given of an example in which moving images of One Seg broadcasting is subjected to the double speed conversion. Yet, the frame interpolation apparatus 100 according to the present embodiments is applicable not only to such usage but also to the frame rate conversion of a variety of moving images. In particular, the frame interpolation apparatus 100 may prove effective when applied to moving images of low frame rate, such as those captured by "low-specification" cameras. For example, it is also applicable to the frame rate conversion of moving images at frequencies below 15 Hz.

In the above embodiments described in conjunction with FIG. 4, FIG. 6 and FIG. 7, a description has been given of the example where the moving images of 15 Hz are subjected to the double speed conversion. In the following modification, a description will be given of an example where the moving images of 30 Hz are subjected to the double speed conversion. Some video-sharing sites on the Internet limit the frame rate of the moving images posted by users to 30 Hz or less. Also, there are cases where some users post the moving images of 30 Hz even though there is no such limit set by the sites. In this case, the moving images of 30 Hz are downloaded to the display apparatus 500 from a video-sharing site via the Internet. Also, there may be some cases where the moving images of 60 Hz are downgraded to those of 30 Hz and then downloaded due to the bandwidth constraint of the lines used.

FIG. 11 is a timing chart showing a basic operation of a frame interpolation apparatus 100 according to a modification. FIG. 11 illustrates a case where the frames received at a frequency of 30 Hz from a video-sharing site via the Internet are subjected to a simple duplicating process performed by the copying unit 330 of the image generating apparatus 300, so that the number of frames is increased two times and then the thus increased frames are inputted to the frame interpolation apparatus 100.

In FIG. 11, two identical successive frames A are inputted. An interpolated frame is generated among different successive frames. Thereby, the moving images inputted are subjected to the double speed conversion. The frame acquisition unit 20 keeps one of the two identical successive frames and discards the other frame. Here, a first frame is subjected to input processing while the remaining one frame is discarded.

The timing chart of FIG. 11 shares the same basic construction with the timing chart of FIG. 4. The following explanation touches on the differences between the two. The timing chart of FIG. 11 differs from the timing chart of FIG. 4 in that the output frames are each outputted alternately between an interpolated frame and a base frame. Thus, the processing period for each sequence (hereinafter referred to as "sequence processing period) includes an input period (base F input), a first matching period (BM1), a second matching period (BM2), an interpolated frame calculation period (interpolation F calculated), a first output period (interpolation F output), and a second output period (base F output). Also, the timing chart of FIG. 11 differs from that of FIG. 4 in that a sequence processing period that follows the preceding sequence processing period starts from the second matching period (BM2) of the preceding sequence processing period. Similarly to the timing chart of FIG. 4, the setting in the pipeline processing shown in FIG. 11 is done so that the timings of the input period (base F input) and the interpolated frame calculation period (interpolation F calculated) should not be scheduled over the same period. Thus, an increase in the amount of data accessed to the storage 10 can be suppressed in the pipeline processing shown in the timing chart of FIG. 11, too.

In FIG. 11, a description has been given so far of the example where the two identical consecutive frames are inputted ideally to the frame interpolation apparatus 100 from the image generating apparatus 300. However, due to the effect of communication lines, decoding processing and the like, it is possible that the moving images received at the image generating apparatus 300 side are sometimes actually inputted discontinuously or three consecutive frames are sometimes inputted instead. In the modification, the sampling point changing unit 54 shifts the sampling point adaptively while keeping the aforementioned cycles when there is a succession of less than or more than two frames determined to be identical by the identity determining unit 52 (e.g., 1 or 3 frames).

(3-Frame Repetition Input)

Hereinbelow, a description will be given of an operation when there is a succession of three identical frames in moving images supplied from the image generating apparatus 300. The sampling point changing unit 54 delays the sampling point by one frame in time when there is a succession of three frames determined to be identical by the identity determining unit 52 and the same frame is sampled repeatedly.

FIG. 12 is a timing chart showing an operation example where the frame interpolation apparatus 100 according to the modification handles a 3-frame repletion input. Note that the timing chart of FIG. 12 is based on the timing chart of FIG. 11. The following explanation touches mainly on the differences between the two.

In FIG. 12, three frames D are inputted consecutively. In this operation example, when the identity determining unit 52 detects the succession of three identical frames and detects that the third frame is one at a sampling point, the identity determining unit 52 sets a flag (hereinafter referred to as "duplication flag") in the next frame period. Once this duplication flag is set, the sampling point changing unit 54 shifts the sampling point to the flagged period. The sampling cycle, which is essentially fixed, is changed in an exceptional move when this duplication flag is set. Also, in sequence 3 where the duplication-flagged period is to correspond to a second output period (base F output), the first output period (interpolation F output) is set again to the duplication-flagged period. The second output period (base F output) is set to the next period. Also, in sequence 4 where the duplication-flagged period is to correspond to an interpolated frame calculation period (interpolation F calculated), NOP is inserted to the duplication-flagged period, and the interpolated frame calculation period (interpolation F calculated) and its subsequent periods are delayed by one frame in time. As a result, the consistency can be attained between sequence 4 and sequence 5, in which the sampling point is delayed in time by one frame.

After sampling frame D1, the frame acquisition unit 20 samples, two frames later, frame D3, which turns out to be the same frame D. At the completion of detecting the third frame, it can be judged that the same frame D has been repeated at least three times. Now, based on this judgment, the next frame E1 becomes a candidate for a duplication flag. Also, since the frame D3 preceding the frame E1 is positioned at the sampling frame of the base frame input period (base F input), the result is the sampling of frame D, which has been repeated three times, twice consecutively. Thus, based on this result, the duplication flag is finally set at the position of frame E1. Once this duplication flag is set, the frame acquisition unit 20 samples the frame E1 of the flagged period irrespective of the 2-frame sampling cycle. After this, the 2-frame sampling cycle resumes with this sampling point as a new starting point.

As described above, when the frame acquisition unit 20 has sampled the same frame twice consecutively, the processing for the period sampled for the second time is treated as practically invalid. That is, frame D3 sampled for the period is discarded. Although the frame output unit 40 outputs interpolated frame BC, which is for frame B and frame C, externally in the period, the interpolated frame BC is again outputted externally in the next period. The user sees the interpolated frame BC one frame longer, but recognizes practically no adverse effect on visibility.

Even when the same frame is detected three times consecutively, a duplication flag will not be set if the sampling point is not at the frame preceding one to which the duplication flag is to be set. In such a case, there will be no change in sampling point, with the sampling cycle maintained in the same repetition timing.

(No Repetition Input)

Hereinbelow, a description will be given of an operation when there is no succession of identical frames in moving images supplied from the image generating apparatus 300. The sampling point changing unit 54 advances the sampling point by one frame in time when there is no succession of frames determined to be identical by the identity determining unit 52.

FIG. 13 is a timing chart showing an operation example where the frame interpolation apparatus 100 according to the modification handles a case when there is no successive frame input. Note that the timing chart of FIG. 13 is based on the timing chart of FIG. 11. The following explanation touches mainly on the differences between the two. In the timing chart of FIG. 11, the first frame of the two consecutive frames inputted is sampled. A description is given of the timing chart of FIG. 13 where the second frame thereof is sampled. In addition, the first frame is sampled in advance as a temporary frame. More specifically, in parallel with the first matching processing by the first block matching circuit 32, the frame acquisition unit 20 samples the temporary frame and inputs the sampled temporary frame to the storage 10 or another temporary storage. That is, the first matching period (BM1) and the input period (base F input) of a base frame (temporary frame) are set at the same time.

In FIG. 13, one frame D only is inputted. In this operation example, suppose that the identity determining unit 52 detects that the frame following frame D1 is frame E1 and therefore frame D does not repeat and also suppose that the frame E2 following this frame E1 is not a temporary frame but one at a sampling point for normal frames. Then the identify determining unit 52 sets a flag (hereinafter referred to as "absence flag") at the next frame E2 period. Once this absence flag is set, the sampling point of sequence 5 is shifted in the absence-flagged period by the sampling point changing unit 54. In this operation example, the sampling point of sequence 5 is advanced one frame in time.

After sampling frame C2, the frame acquisition unit 20 samples, two frames later, frame E1. Since only a single frame D is inputted, frame E will be sampled following frame C. At the completion of input of frame E1, the identity determining unit 52 can determine that the frame D does not repeat itself. Now, based on this determination, frame E2 next to frame E1 becomes a candidate for an absence flag. Also, since frame E1 preceding this frame E2 is positioned at the sampling frame of the base frame input period (base F input), the result is that no sampling is made of frame D which is not repeating itself. Thus, based on this result, the absence flag is finally set at the position of frame E2. Once this absence flag is set, the frame acquisition unit 20 samples frame E2 in the absence-flagged period (sequence 5), irrespective of the 2-frame sampling cycle. Yet, no sampling is made of frame E2, which is a temporary frame (sequence 4). After this, the 2-frame sampling cycle resumes with this sampling point as a new starting point.

In sequence 4, once the absence flag is set, the first block matching circuit 32 performs a first matching processing between frame C and frame D using the temporary frame D1 sampled in sequence 3 without using frame E1 sampled immediately before that point. Subsequent to that, the second matching processing by the second block matching circuit 33 is also performed between frame C and frame D, and the interpolated frame calculation processing by the interpolated frame calculation unit 35 is also performed between frame C and frame D. The output processing by the frame output unit 40 subsequent to that, outputs only the interpolated frame CD, between frame C and frame D, calculated by the interpolated frame calculation unit 35. As a result, the consistency can be attained between sequence 4 and sequence 5, in which the sampling point is advanced in time by one frame. The user sees the based frame D one frame shorter, but recognizes practically no adverse effect on visibility.

Note that even when no two consecutive frames (namely a single frame alone) and the following frame changing into another frame are detected, the duplication flag will not be set if the sampling point is not at the frame preceding the frame with the absence flag set. In such a case, the sampling point is not changed, and the previous sampling cycle is maintained.

In the operation example described in conjunction with FIG. 13, a description is given of the example where the interpolated frame CD only is outputted in sequence 4. Yet, the base frame D only may be outputted instead of the interpolated frame CD. In such a case, the user sees the interpolated frame CD one frame shorter, but recognizes practically no adverse effect on visibility.

Generally, the quality of base frames are higher than that of interpolated frames calculated by the interpolated frame calculation unit 35. Thus, the quality of images improves when the base frames D only are outputted instead of when the interpolated frames CD only are outputted. When the base frames D only are outputted, the first block matching circuit 32, the second block matching circuit 33 and the interpolated frame calculation circuit 35 calculate an interpolated frame between frame C and frame D similarly to FIG. 13. However, the frame output unit 41 outputs the base frame D only without using this calculation result. Thus, the arrangement achieved without performing these calculations may be implemented. Accordingly, when the base frames D only are to be outputted in sequence 4, the arrangement has the merit of improved image quality.

What is claimed is:

1. A frame interpolation apparatus for receiving moving images from an image generating apparatus that outputs moving images by increasing the number of frames by adding n units (n being a natural number) of copy frame following each frame of the moving images, the frame interpolation apparatus comprising:
   a frame acquisition unit configured to sample a frame from the moving images in cycles of (n+1) frames;
   an interpolated frame generating unit configured to generate an interpolated frame to be inserted between the frames sampled by said frame acquisition unit;
   an identity determining unit configured to determine the identity of successive frames of the moving images; and
   a sampling point changing unit configured to shift a sampling point while keeping fixed cycles when there is a succession of less than or more than (n+1) frames determined to be identical by said identity determining unit and besides a certain condition is met,
   wherein when there are more than (n+1) frames determined to be identical by said identity determining unit and the frame determined to be identical thereby is sampled repeatedly, said sampling point changing unit delays the sampling point by at least one frame in time.

2. A frame interpolation apparatus according to claim 1, wherein the frame interpolation apparatus receives a supply of the moving images from the image generating apparatus that operates at a frequency higher than the operation frequency for generating the n units of copy frames.

3. A frame interpolation apparatus according to claim 1, wherein the frame interpolation apparatus receives a supply of the moving images from the image generating apparatus that operates at a frequency higher than the operation frequency for generating n units of copy frames.

4. A frame interpolation apparatus for receiving moving images from an image generating apparatus that outputs moving images by increasing the number of frames by adding n units (n being a natural number) of copy frame following each frame of the moving images, the frame interpolation apparatus comprising:
   a frame acquisition unit configured to sample a frame from the moving images in cycles of (n+1) frames;
   an interpolated frame generating unit configured to generate an interpolated frame to be inserted between the frames sampled by said frame acquisition unit;
   an identity determining unit configured to determine the identity of successive frames of the moving images; and
   a sampling point changing unit configured to shift a sampling point while keeping fixed cycles when there is a succession of less than or more than (n+1) frames determined to be identical by said identity determining unit and besides a certain condition is met,
   wherein when there are less than (n+1) frames determined to be identical by said identity determining unit and the frame determined to be identical thereby is not sampled within a cycle, said sampling point changing unit advances the sampling point by at least one frame in time.

5. A frame interpolation apparatus according to claim 4, wherein the frame interpolation apparatus receives a supply of the moving images from the image generating apparatus that operates at a frequency lower than the operation frequency for generating the n units of copy frames.

6. A frame interpolation apparatus according to claim 4, further comprising:
   a storage configured to store a base frame acquired from the moving images and the interpolated frame; and
   a frame output unit configured to read the base frame and the interpolated frame so as to be outputted to an exterior in display order,
   wherein said frame acquisition unit writes the acquired base frame to the storage,
   wherein said interpolated frame generating unit reads a plurality of base frames from said storage, generates an interpolated frame between the plurality of base frames, and writes the interpolated frame to said storage, and
   wherein said frame acquisition unit, said interpolated frame generating unit and said frame output unit operate in parallel with one another so as to execute pipeline processing, and
   wherein said sampling point changing unit advances the sampling point in time such that there results a lag between timing of said frame acquisition unit writing the base frame to said storage and timing of the interpolated frame generating unit writing the interpolated frame to said storage.

7. A frame interpolation apparatus for receiving moving images from an image generating apparatus that outputs moving images by increasing the number of frames by adding n units (n being a natural number) of copy frame following each frame of the moving images, the frame interpolation apparatus comprising:
   a frame acquisition unit configured to sample a frame from the moving images in cycles of (n+1) frames;
   an interpolated frame generating unit configured to generate an interpolated frame to be inserted between the frames sampled by said frame acquisition unit;
   an identity determining unit configured to determine the identity of successive frames of the moving images; and
   a sampling point changing unit configured to shift a sampling point while keeping fixed cycles when there is a succession of less than or more than (n+1) frames determined to be identical by said identity determining unit and besides a certain condition is met,
   wherein the frame interpolation apparatus receives a supply of the moving images from the image generating apparatus that operates at a frequency lower than the operation frequency for generating the n units of copy frames, the frame interpretation apparatus further comprising:

a storage configured to store a base frame acquired from the moving images and the interpolated frame; and a frame output unit configured to read the base frame and the interpolated frame so as to be outputted to an exterior in display order, wherein said frame acquisition unit writes the acquired base frame to the storage, wherein said interpolated frame generating unit reads a plurality of base frames from said storage, generates an interpolated frame between the plurality of base frames, and writes the interpolated frame to said storage, and wherein said frame acquisition unit, said interpolated frame generating unit and said frame output unit operate in parallel with one another so as to execute pipeline processing, and wherein said sampling point changing unit advances the sampling point in time such that there results a lag between timing of said frame acquisition unit writing the base frame to said storage and timing of the interpolated frame generating unit writing the interpolated frame to said storage.

8. A frame interpolation apparatus according to claim 5, further comprising:

a storage configured to store a base frame acquired from the moving images and the interpolated frame; and a frame output unit configured to read the base frame and the interpolate frame so as to be outputted to an exterior in display order, wherein said frame acquisition unit writes the acquired base frame to the storage, wherein said interpolated frame generating unit reads a plurality of base frames from said storage, generates an interpolated frame between the plurality of base frames, and writes the interpolated frame to said storage, and wherein said frame acquisition unit, said interpolated frame generating unit and said frame output unit operate in parallel with one another so as to execute pipeline processing, and wherein said sampling point changing unit advances the sampling point in time such that there results a lag between timing of said frame acquisition unit writing the base frame to said storage and timing of the interpolated frame generating unit writing the interpolated frame to said storage.

9. A frame interpolation apparatus according to claim 1, wherein said identity determining unit determines the identity thereof by calculating the sum total of pixel values in each frame of the moving images.

10. A frame interpolation apparatus according to claim 1, wherein said identity determining unit determines the identity of successive frames of the moving images from a region which is at least free of on-screen display (OSD) superposed on each frame.

* * * * *